ately fixed to with webs of the respective brake
United States Patent [19]

Gee

[11] Patent Number: 4,981,200
[45] Date of Patent: Jan. 1, 1991

[54] BRAKE HAVING ANCHOR BEARING ON IMMOVABLE SPIDER

[75] Inventor: Thomas A. Gee, Allen Park, Mich.

[73] Assignee: Eaton Corporation, Cleveland, Ohio

[21] Appl. No.: 398,598

[22] Filed: Aug. 25, 1989

[51] Int. Cl.$^5$ .............................................. F16D 65/09
[52] U.S. Cl. ..................................... 188/341; 188/329; 188/205 R; 188/206 R; 188/330
[58] Field of Search .............. 188/327, 328, 329, 330, 188/340, 341, 331-334, 335, 338, 339, 250 A, 250 C, 250 F, 250 G, 250 R, 250 B, 205 R, 205 A, 206 R, 206 A

[56] References Cited

U.S. PATENT DOCUMENTS

| Re. 31,531 | 3/1984 | Williams | 188/341 |
|---|---|---|---|
| 2,002,139 | 5/1935 | Des Rosiers | 188/330 X |
| 2,195,261 | 3/1940 | Rasmussen et al. | 188/327 X |
| 2,453,808 | 11/1948 | Myklestad | 188/327 X |
| 2,642,159 | 6/1953 | House | 188/329 |
| 2,710,076 | 6/1955 | Russell | 188/330 |
| 3,095,950 | 7/1963 | Scheel | 188/216 X |
| 3,096,857 | 7/1963 | Dombeck | 188/332 |
| 3,497,037 | 2/1970 | Deibel | 188/329 X |
| 4,353,442 | 10/1982 | Correa | 188/250 F X |
| 4,476,968 | 10/1984 | Urban et al. | 188/329 |
| 4,503,953 | 3/1985 | Majewski | 188/332 X |
| 4,552,254 | 11/1985 | Baltare | 188/341 X |
| 4,624,348 | 11/1986 | Williams | 188/250 C X |
| 4,807,729 | 2/1989 | Sampson | 188/330 |

Primary Examiner—Douglas C. Butler
Attorney, Agent, or Firm—C. H. Grace

[57] ABSTRACT

An improved "expanding-shoe" drum brake (100), including an immovable spider member (38) to which brake shoes (18, 19) are pivotally mounted to move into engagement with a rotating annular brake drum (10). As is common, the shoes move in response to motion of a brake-actuating rotatable S cam (12), which is located between first adjacent ends of the brake shoes. The cam applies force to two cam followers (14, 15), which are rollers rotatably fixed to respective brake shoes. At the second end of each brake shoe an anchor pin (30, 31) is fixedly mounted to with webs of the respective brake shoe, as by welding (57A, 57B). In the embodiment described, a corresponding receptacle (43, 45) in the immovable spider has a semicircular surface (49, 51) at its bottom to serve as a bearing. The bearing surface engages the anchor pin, for rotation of the shoe. The brake shoe is resistant to twisting and misalignment.

6 Claims, 3 Drawing Sheets

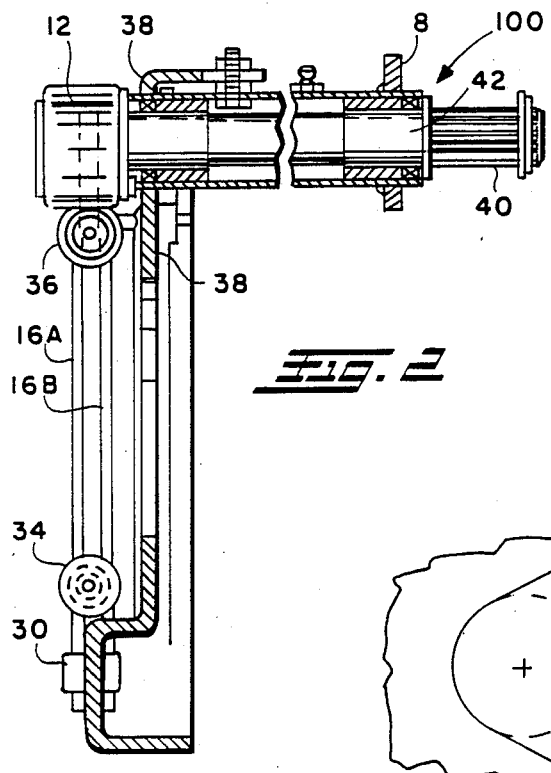
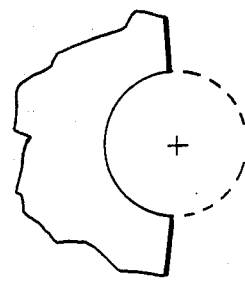
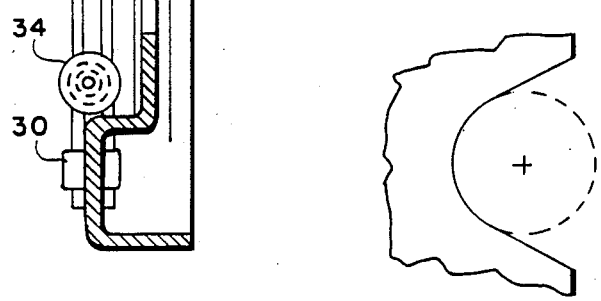
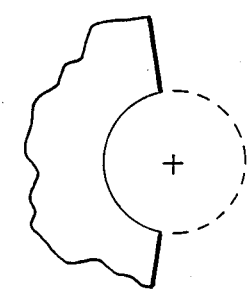
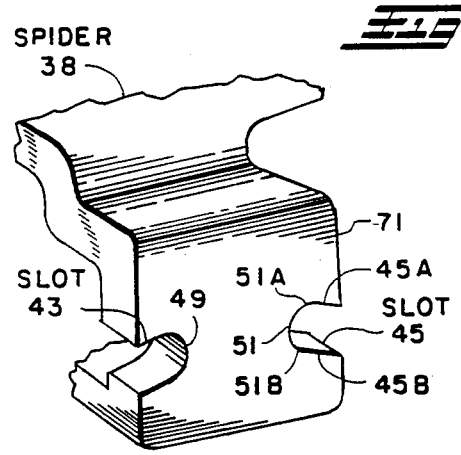
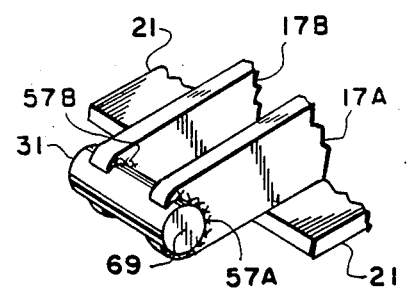

BRAKE HAVING ANCHOR BEARING ON IMMOVABLE SPIDER

INTRODUCTION

This invention relates to drum brakes and more particularly to an improved "expanding-shoe" drum brake, including a spider member to which brake shoes are pivotally mounted. The brake shoes are movable between radially retracted and radially expanded positions in response to motion of a cam or a wedge relative to the spider member.

BACKGROUND OF THE INVENTION

Expanding-shoe drum brakes for wheeled vehicles are well know in the art—especially drum brakes that are hydraulically actuated or air actuated, in which arcuate brake shoes are pivoted about anchor members. By the use of a brake-actuating member such as a cam, the brake shoes are moved into frictional engagement with a rotating annular brake drum in order to reduce the vehicle's speed.

The brake actuating member, usually a rotatable S cam or a linear wedge, is located between adjacent ends of two pivotal brake shoes and secured to a rotatable cam shaft or a linear actuation shaft, respectively. It translates generally linear motion from a power source, such as an air motor, to move the brake shoes.

Followers, i.e., cam followers or wedge followers, which are often in the form of rollers, are rotatably fixed to the brake shoes. The actuating cam or wedge is usually located between the followers of two shoes where it can apply force simultaneously to both of the followers. Examples of such prior art cam-actuated drum brakes are in U.S. Pat. Nos. 3,497,037; 3,096,857 and 2,002,139, which are hereby incorporated by reference. While the prior art cam-actuated and wedge-actuated drum brakes, especially the S cam type, are well accepted, they are not totally satisfactory. Prior art shoe bearings are often shoe-tip types. In some of those types, a concave circular arc on each shoe (at an end of the shoe opposite the cam-actuated end), serves as a bearing. That bearing on the shoe engages an anchor pin that is mounted on an immovable spider, and the shoe rotates about the anchor pin.

A trend to the use of larger brake linings and the achievement of linings that last longer have resulted in a need for longer life of the metal portions of the brake shoes, and particularly of their bearings. Some shoe-tip bearings are not durable enough.

SUMMARY OF THE INVENTION

In accordance with the present invention, the drawbacks of the prior art have been overcome to the extent that an improved drum brake, such as a cam-actuated or wedge-actuated drum brake having cam followers or wedge followers, is provided, having an improved bearing arrangement for rotation of a brake shoe. The spider is a promising location for providing bearings of longer life than is being achieved with bearings located on the shoe tips.

An object of this invention is to provide a bearing located on a spider of a drum brake instead of on a shoe tip, to enable a brake shoe, which engages the bearing, to pivot between radially expanded and radially retracted positions.

Another object is to provide an improved shoe drum brake having an anchor pin fixedly mounted on a brake shoe and having a bearing surface in a spider, such as, for example, a bearing surface at the fork of a shallow open-ended slot in a spider, to serve as a bearing for engaging the anchor pin for rotation of the shoe.

Another object is to provide an improved shoe drum brake in which a bearing in the spider has usable a bearing surface that extends beyond certain predetermined geometric limits to insure smooth operation for all reasonable conditions of wear of the brake lining.

Another object is to provide an improved shoe drum brake in which the shoes can be easily detached from the spider via sliding attachment arrangements that are not corrupted by corrosion and wear.

Another object is to provide an improved shoe drum brake in which the web(s) and table of a brake shoe stay in untwisted alignment with the spider and the drum.

These and other objectives will become apparent from the description of the preferred embodiments and the drawings.

BRIEF DESCRIPTION OF THE DRAWINGS

FIG. 2 is a sectional view of the same brake assembly taken along a line 2—2 as indicated on FIG. 1.

FIG. 3A is a perspective view of a portion of the slotted spider of FIG. 1.

FIG. 3B is a perspective view of a portion of the right-hand brake shoe of FIG. 1.

FIGS. 4A, 4B, and 4C depict three more shapes of the bearing structure on the spider, from among many possible alternatives.

DESCRIPTION

This invention is especially suitable for double-web, double-anchor-pin, pivoted-shoe brakes; the brake described below as the preferred embodiment of the invention is of that type. The features of the described embodiment include the following:

A. An anchor pin in one end of each of its shoes, mounted to the shoe by welding (but could instead be mounted by press fitting, etc.).

B. Open-ended slots in a spider, in which the fork of each slot serves as bearing surface to accept the anchor pin that is on the corresponding shoe.

C. The bearing surface of each slot extends at the cam-side end of the bearing surface to an angle that depends upon the worn-lining geometry and other factors.

D. The bearing surface of each slot extends at the other (non-cam-side) end of the bearing surface to an angle that depends upon the new-lining geometry and other factors.

E. A spring, for retaining the anchor pins of the shoes in engagement with the bearing surfaces of the open-ended slots in the spider.

Figure 1A:
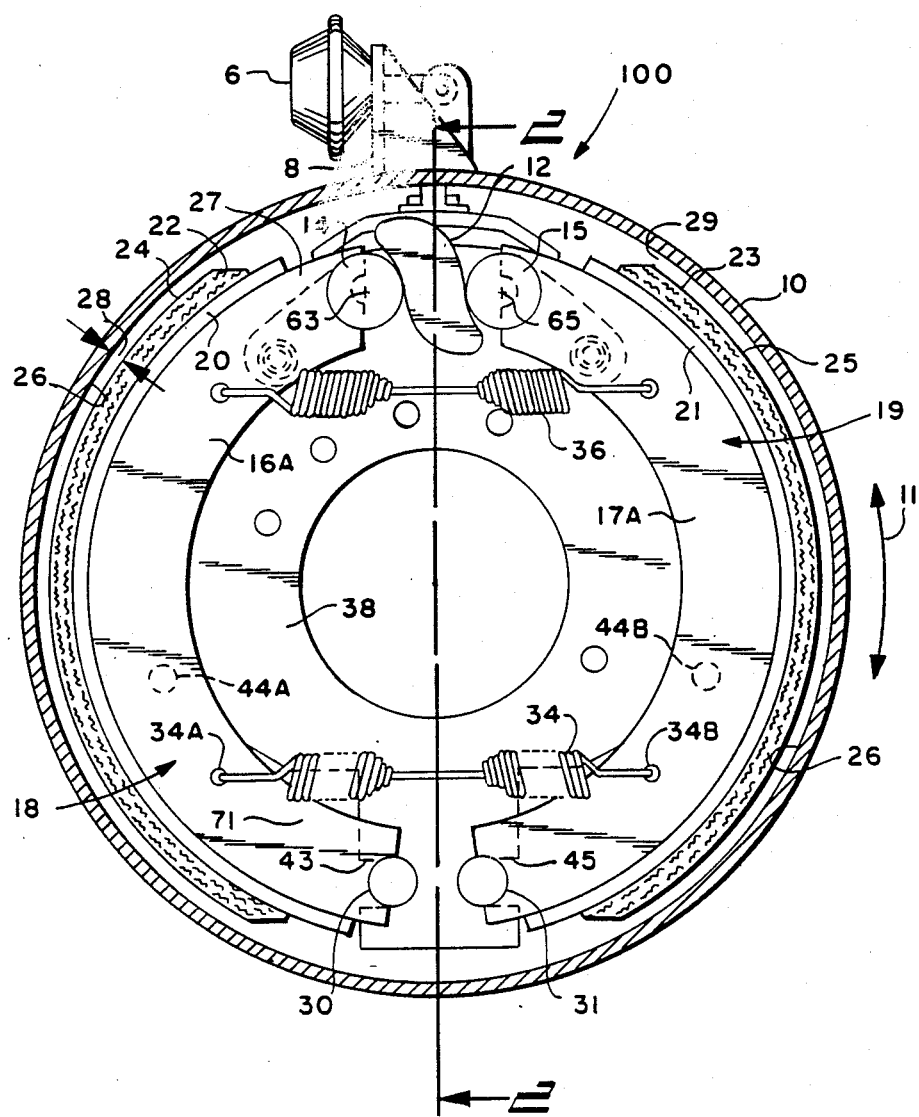
FIG. 1A is a front view of the improved brake assembly of the present invention when the brake is not applied.

FIG. 1A is a front view of a cam-actuated preferred embodiment 100 of a shoe drum brake incorporating the invention. Brake 100 is operative to frictionally brake a rotary drum 10 at the end of the motor vehicle axle, which may be rotating in either direction as indicated by the arrows 11. The brake 100 is commonly actuated by an air motor such as motor 6 of this example, but may instead be actuated mechanically or hydraulically. The air motor 6 is secured to an actuator support 8, which in turn is fixed to the frame of the vehicle.

The brake 100 has a rotary cam such as the S cam 12 that rotates clockwise in FIG. 1A when the air motor 6 is actuated by depressing of the brake pedal of the vehicle. Opposed cam surfaces of the cam 12 engage cam followers such as left-hand and right-hand follower rollers 14, 15, which are rotatably mounted at left-hand and right-hand positions on a web structure 27. The actuation forces of the cam 12 effectively pass from the cam 12 to said followers (rollers 14, 15) through respective pivotal points (63, 65) of the follower rollers.

The web structure 27 includes left-hand and right-hand brake shoes 18 and 19 respectively, each of which has two parallel rib-shaped side webs. As shown in FIGS. 1A and 2, shoe 16 has an "exterior" side web 16A and an "interior" side web 16B. Shoe 17 has an exterior side web 17A and an interior side web 17B.

Each of the left-hand and right-hand brake shoes 18 and 19 also includes an arcuate "table" 20, 21 respectively, that is secured to the side webs 16A, 16B, 17A, 17B in substantially transverse relationship to the side webs (FIG. 1A). A brake lining friction material 22, 23 is secured to the surface of each table 20, 21 facing toward the drum 10. An outer radial surface 24, 25 of the friction material 22, 23 frictionally engages an inner radial surface 26 of drum 10 when the brake shoes 18, 19 are pushed away from each other by clockwise rotation of the cam 12.

When the brake shoes 18, 19 are in a retracted position (i.e. brakes not applied), as shown in FIG. 1A, an initial predetermined running clearance exists between the surfaces 24 and 26, as indicated by numeral 28. A similar clearance exists between the surfaces 25 and 26, as indicated by numeral 29. The follower rollers 14, 15 are held in contact with the cam 12 by a retaining spring 36, which is hooked to the exterior side webs 16A, 17A of brake shoes 18, 19.

The brake shoes 18, 19 are provided with anchor pins 30 and 31 respectively at the "lower" ends of the shoes as shown in FIG. 1A, (i.e., at the ends that are opposite the ends having the follower rollers 14, 15). The anchor pins 30, 31 are preferably right circular cylinders or portions thereof. Pin 30 is preferably permanently mounted to the side webs 16A, 16B, and pin 31 is preferably permanently mounted to the side webs 17A, 17B. In the embodiment being described the pins are held by welds, as illustrated by the welds 57A and 57B of FIG. 3B in the case of pin 31.

As shown in FIG. 2, a cam shaft 42 is rotatably driven at its right end 40 by the air motor 6. A spider 38, also in FIG. 2, is secured to the vehicle via a fixed frame. As is shown in FIG. 2, the spider 38 is immovable with respect to the drum 10. The interior side web portions 16B, 17B of the web structure 27 of the brake shoes 18, 19 are spaced apart from the spider 38. A brake such as the brake 100 may include pins 44A, 44B, (FIG. 1A) secured to the spider 38, whose ends engage inner surfaces of the interior side webs 16B, 17B to provide support for the brake shoes 18, 19 as the shoes move.

The lower end of the immovable spider 38 has left-hand and right-hand open-ended slots 43, 45 in this particular embodiment, as shown in FIG. 1A and more clearly in FIG. 3A. The open-ended slot 43 of this particular embodiment has straight sides and an end bearing surface 49 that is a segment of a circle. The diameter of the end 49 is equal to that of the left-hand anchor pin 30, which it engages when the brake is fully assembled, so that the end 49 serves as a bearing for the anchor pin 30. Similarly, the slot 45 has a circular bearing surface end 51, which engages the right-hand anchor pin 31.

The slots' bearing surfaces 49, 51 are held against the pins 30, 31 by a spring 34, which is similar to spring 36. The spring 34 is hooked into holes 34A, 34B (FIG. 1A) in the exterior side webs 16A, 17A respectively. Spring 34 itself is not drawn on FIG. 1A because its image would occlude an important portion of the bearing structure, but it is shown in FIG. 2. Lower ends of the side webs 16A and 16B straddle the left side of a bridge portion 71 of the spider 38; lower ends of the side webs 17A, 17B straddle the right side of the bridge portion 71 of the spider 78.

FIG. 3B makes clear the fact that the anchor pin 31, because it is welded to the side webs 17A and 17B by welds 57A and 57B, serves to stiffen the brake shoe assembly. The webs 17A, 17B, as well as the table 21 and therefore the friction lining 23, are more resistant to twisting and skewing relative to the spider 38 and the drum 10, because of the rigidly welded anchor pin 31. If preferred, the pin 31 could instead be welded to only one of the two side webs 17A, 17B.

In a single-web embodiment, (not shown), a single web replaces the pair of webs 17A and 17B, and the spider can be provided with a clevis instead of the bridge 71. A rigid weldment of the anchor pin 31 to the single web, together with the spring-loaded rotational engagement of both ends of the anchor pin 31 against the two sides of the clevis, (each side of the clevis having a bearing), reduces twisting and misalignment of the single-web brake shoe.

In the preferred embodiment the pin 31 is a circular cylinder, and the pin and bearing rotate freely relative to each other, so force is transmissible only along radial lines through the center of the pin 31 (FIG. 3A). The direction of the radial line of transmitted force varies with the wear condition of the brake lining etc. For convenience the point at which the radial line of transmitted force intersects the bearing surface 51 is referred to as the main point of contact of the bearing.

Continuing with FIG. 3A, the portion of the spider that includes the bearing surface 51 that engages the pin 31 has been referred to in the foregoing description of the preferred embodiment as the "open-ended slot" 45. A more generic term for the bearing surface and its neighboring edges, which is applicable to more embodiments and is used in the claims, is "receptacle".

As the lining of the shoes wears away, the shoes must rotate outward to contact the drum. In one example of brake, the metal portions of a shoe are positioned approximately 6° farther outward when the lining is severely worn than when it is new. Therefore, an accurate description of the angular relationship of a spider's receptacle to the corresponding shoe requires that the shoe's position be defined.

"Upper" and "lower" refer herein to the brake as depicted in all of the figures. In FIG. 3A, the slot or receptacle 45 has an upper side 45A (the side nearer the cam 12) and a lower side 45B, (the side farther away from the cam 12). The bearing surface portion 51 of the receptacle extends from an upper limit or end point 51A (on the side of the bearing surface that is nearer the cam), to a lower limit 51B (on the other side of the bearing surface, which is farther away from the cam).

The location of the upper limit 51A and the location of the lower limit 51B of the bearing-surface portion 51 are determined by differing geometric considerations, which will now be described.

Shoe Geometry With New Brake Lining

Figure 1B:
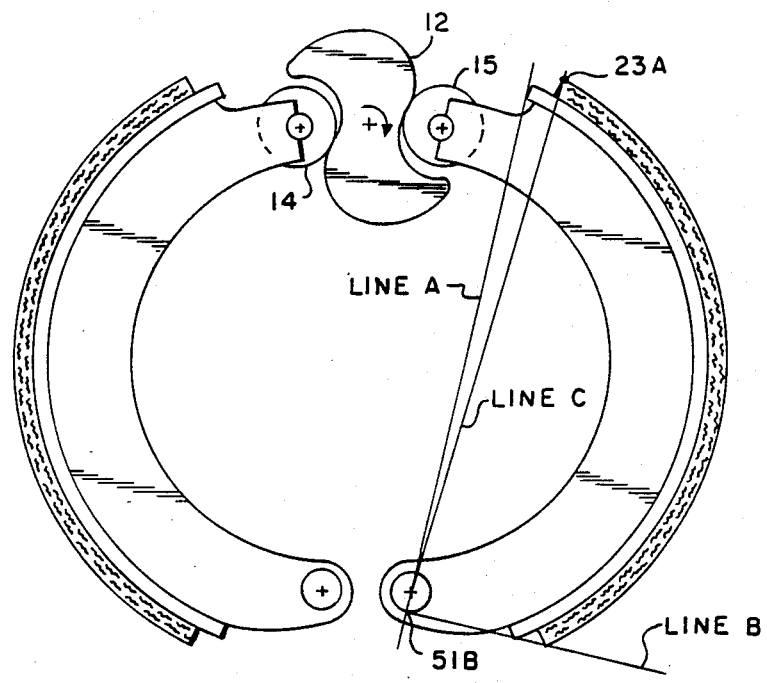
FIG. 1B is a front view of the brake assembly when the brake lining is new and the brake is being applied.

Referring to FIG. 1B, which shows new brake lining 22, 23, the S cam 12 is in an angular position in which the two cam followers 14, 15 are near each other. FIG. 1B shows the new brake lining in a position to make initial contact with the brake drum 10. An imaginary straight line C is shown extending from a pivot point 69 of the anchor pin 31 to a point 23A on the outside of the brake lining 23 that is the closest such point to the cam 12.

Another line, denoted line A, passes through the center of the pin 31. As shown in FIG. 1B, line A is coincident with or angularly displaced counterclockwise away from line C toward the center of the cam 12.

Another line, line B, is perpendicular to line A, and is a tangent line to the pin 31. The point of tangency 51B is the limiting location of the edge of the bearing surface portion 51 of the receptacle 45. The bearing surface must extend at least this far.

In other words, the lower side 45B of the spider receptacle (slot) 45 extends in such a direction that a straight line perpendicular to its tangent (at tangent point 51B) passes either through the point 23A (i.e. the location of the outside of the lining closest to the cam 12) or inward thereof, (i.e., toward the cam 12).

Thus the receptacle (45) comprises a bearing surface portion (51) of sufficient angular extent to be able to retain its respective anchor pin (31) when the bearing surface portion (51) transmits retaining force against its pin (31). The bearing surface extends counterclockwise around pin 31 to or beyond a point (51B) diametrically opposite a point (23A) where the top of new brake lining first contacts the drum (10) upon application of the brake.

Shoe Geometry With Greatly Worn Brake Lining

Figure 1C:
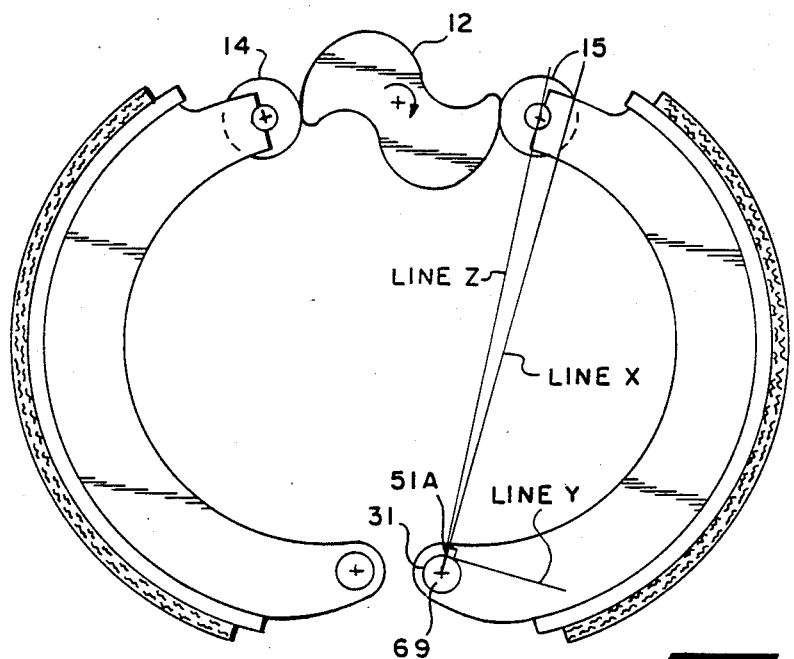
FIG. 1C is a front view of the brake assembly when the brake lining is almost worn out and the brake is being applied.

FIG. 1C depicts a situation in which the brake lining is severely worn, and is in a position making contact with the brake drum 10. The S cam 12 is in an angular position that forces the cam followers 14 and 15 far apart from each other. An imaginary straight line Z is shown extending from the pivot point 69 of the anchor pin 31 to the cam follower's pivot point 65.

Another line, denoted line X, passes through the center of the pin 31. Line X is coincident with line Z or, as shown in FIG. 1C, angularly displaced clockwise away from line Z, i.e., away from the center of the cam 12.

Another line, line Y, is perpendicular to line X and is a tangent line to upper edge of the pin 31. The point of tangency 51A is the limiting location of the edge of the bearing surface portion 51 of the receptacle 45 The bearing surface portion 51 must extend at least this far.

In other words, the upper side 45A of the spider receptacle (slot) 45 extends in such a direction that a straight line perpendicular to its tangent (at point 51A) either passes through the point 65 (i.e. the pivot of the cam follower 15) or outward thereof, (i.e., away from the cam 12).

Thus the receptacle (45) comprises a bearing surface portion (51) of sufficient angular extent to be able to retain its associated anchor pin (31) when the bearing surface portion (51) transmits retaining force against its pin (31). The bearing surface portion (51) extends clockwise around pin 31 to or beyond a point (51A) that lies on a line through the pivot points 65 and 69 of the cam follower 15 and the pin 31 respectively.

To summarize, the end (51A) of the bearing surface portion (51) on the upper side 45A is determined by the shoe geometry when the lining is in its most worn condition. The end (51B) of the bearing surface portion (51) on the lower side 45B is determined by the shoe geometry when the lining is new.

Adequate width of bearing surface (at least between the limit points 51A and 51B and often beyond) is necessary to ensure shoe bearing support for cases where brake parameters are at the extremes of the permissible range of values of the nominal brake design, e.g., when one or more parameters differ markedly from their nominal values. Two examples of such important parameters are (a) the coefficient of friction at the lining/drum interface (25, 26) and (b) the contact pattern of the lining (23) and drum (10). The main point of contact of the bearing in normal situations must be well within the end points of the bearing surface.

The operation of the brake mechanism is as follows. Application of the brake pedal causes the air motor 6 to rotate the cam 12. That forces the rollers 14, 15 away from each other, which causes brake shoes 18, 19 to pivot apart about their respective anchor pins 30, 31, which moves the brake shoes 18, 19 to radially expanded relative positions. The surfaces 24, 25 of brake friction material 22, 23 then frictionally engage the inner radial surface 26 of the rotary drum 10 to retard rotation of drum 10.

Release of the brake pedal permits the rollers 14, 15 to move toward each other under the tension force of spring 36, enabling the brake shoes 18, 19 to pivot about their anchor pins 30, 31 and return to their radially retracted positions as shown in FIG. 1A.

It is easy to change the shoes of the invented brake structure; this is an important advantage of the invention. As is evident from the figures, the shoes can easily be removed from the spider by sliding them, and their removal cannot be significantly impeded by corrosion or wear.

A previously mentioned alternative is a single-side-web embodiment. It could have an anchor pin welded to the single side web and each such anchor pin could bear upon two semicircular open-ended slots in a two-bridge spider.

Another example of an alternative embodiment is a single-side-web shoe having at its lower end a clevis, to both sides of which an anchor pin is welded; the clevis straddles the slotted bridge portion 71 of FIG. 3A.

The receptacles on the spider need not have any extensions (sides) of the cylindrical bearing section. If the receptacle slot has any sides, they can be non-parallel. FIGS. 4A, 4B, and 4C show some examples of variations.

In FIG. 4A the receptacle has no slot sides; it comprises merely a semi-cylinder, which is the bearing surface itself.

In FIG. 4B the receptacle is an open-ended slot having sides that are not parallel and that are tangent to a cylindical bearing surface at the fork of the slot.

In FIG. 4C the bearing surface of the receptacle is less than a half-cylinder and the edges of the spider recede from the bearing surface.

By way of example of the invention, a preferred embodiment and several variations have been described;

other modifications are also possible within the scope of the invention as claimed

I claim:

1. An improved mechanically cam-actuated expanding-shoe drum brake (100) having a brake drum (10), a pair of generally arcuate brake shoes (18, 19) each of which has two side webs (16A, 16B, 17A, 17B) and carries brakes friction material (22, 23), expansion means (6, 12) operable for brake actuation, each of said brake shoes having follower means (14, 15) at a first end thereof engaged by said expansion means for movement therewith upon application of an actuation force that effectively passes through (at 65) said follower means, said expansion means having positions in which said shoes are radially retracted and radially expanded, comprising:
   a spider member (38) immovably mounted in a fixed relationship to the drum (10), said expansion means being affixed to a first end of said spider member;
   a receptacle (43, 45) in said spider member corresponding to each of said shoes, said receptacles being located at a second end of the spider member generally opposite from said expansion means, each of said receptacles having a pivotal bearing surface (49, 51), the spider member (38), each of the receptacles (43, 45) and each of the bearing surfaces (49, 51) being immovable with respect to each other to extend the life of brake parts thereof;
   an anchor pin (30, 31) rigidly affixed to said side webs at a second end of each of said brake shoes; and
   means (34) for retaining the anchor pin of each of said shoes in pivotal engagement with the bearing surface of the respective receptacle.

2. The brake of claim 1, and wherein each said anchor pin is perpendicular to its associated said side web.

3. The brake of claim 1, wherein each said anchor pin is affixed by welding (57A, 57B).

4. The brake of claim 1, and wherein each said pivotal bearing surface of each of said receptacles comprises a concave segment of a circle arc (49, 51).

5. The brake of claim 1 and wherein each said anchor pin (30, 31) has a surface that is at least a segment of a right circular cylinder, for contacting said respective pivotal bearing surface (49, 51).

6. The brake of claim 1, 2, 3, 4, or 5 wherein each of said receptacles (e.g., 45) in said spider member (38) comprises a bearing surface portion (51) extending at least to a point (51A) situated past a radial line extending from the center of the respective anchor pin (31) to the center (65) of the follower means (15).

* * * * *